J. F. BARBEE.
HARROW ATTACHMENT FOR PLOWS.
APPLICATION FILED APR. 25, 1908.
910,162.
Patented Jan. 19, 1909.
2 SHEETS—SHEET 1.
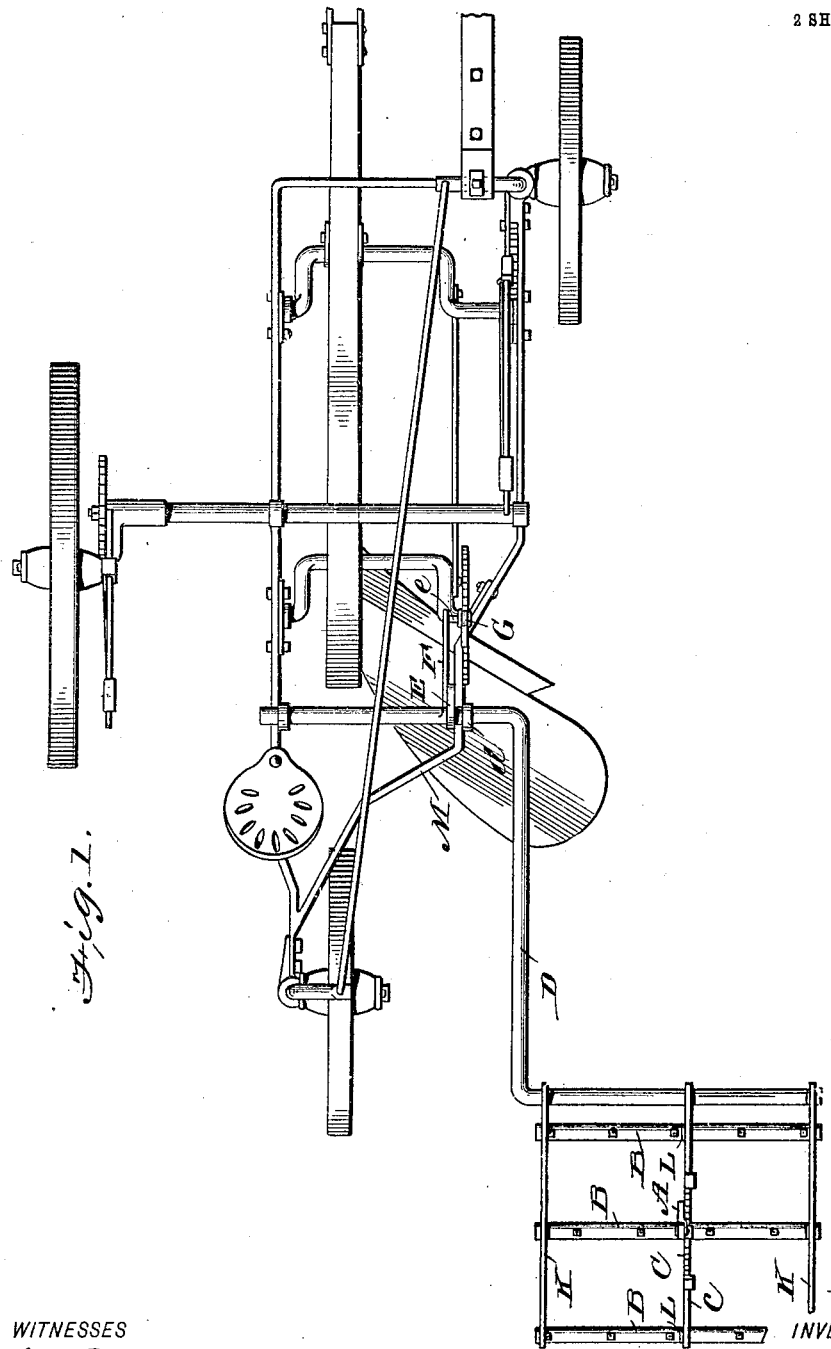
WITNESSES
F. C. Barry
E. M. Callaghan
INVENTOR
JOHN F. BARBEE
BY Munn & Co
ATTORNEYS

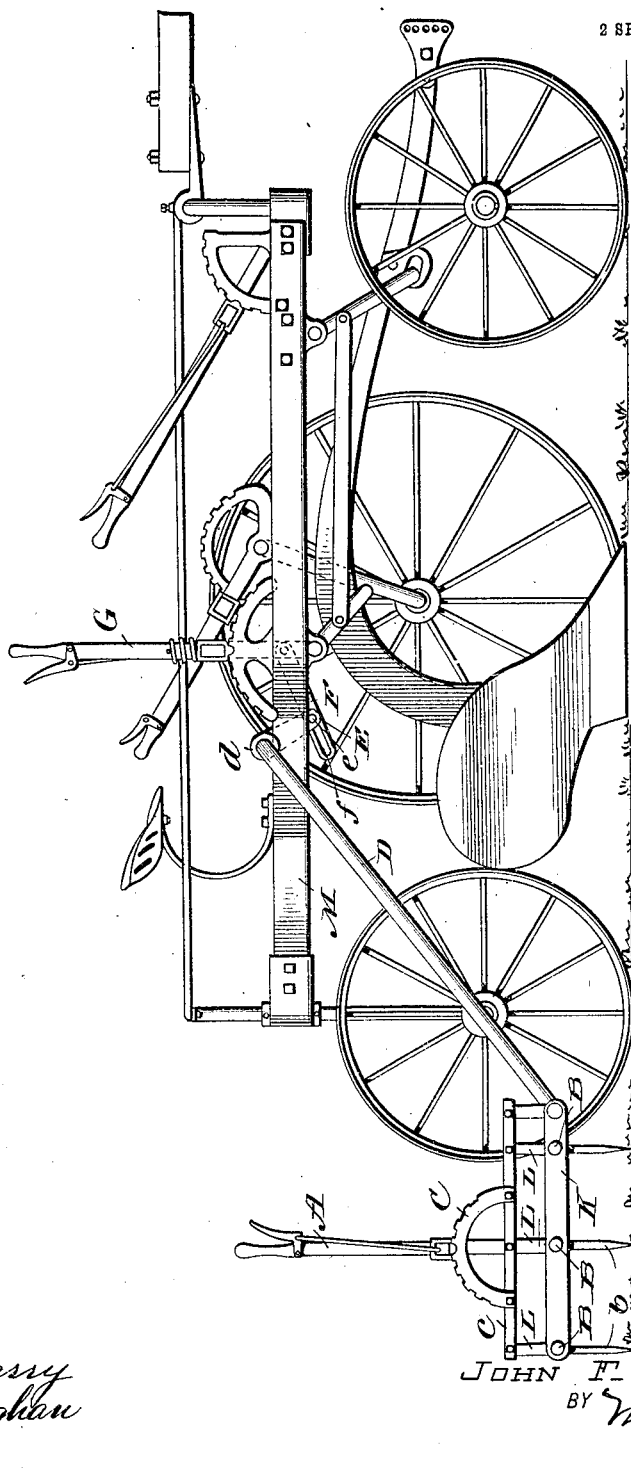

UNITED STATES PATENT OFFICE.

JOHN F. BARBEE, OF GRAND ISLAND, NEBRASKA.

HARROW ATTACHMENT FOR PLOWS.

No. 910,162.  Specification of Letters Patent.  Patented Jan. 19, 1909.

Application filed April 25, 1908. Serial No. 429,193.

*To all whom it may concern:*

Be it known that I, JOHN F. BARBEE, a citizen of the United States, residing at Grand Island, in the county of Hall and State of Nebraska, have invented a new and useful Improvement in Harrow Attachments for Plows, of which the following is a specification.

This invention relates to harrow attachments, particularly designed for attachment to any of the common forms of plows, and the construction is such that it may be applied to right or left hand plows and will serve to harrow the previously turned furrow with sufficient lap to produce a thoroughly level field of pulverized soil.

A particular feature of the invention is the manner in which the device is attached to the frame of the plow or other implement, whereby side draft is avoided. The harrow is attached so as to follow the mold board of the plow closely and so act on the soil at the best time, that is, immediately after it is turned. By means of levers the slant of the harrow teeth and also the relation of the harrow frame to the plow frame may be varied to suit the work or other conditions.

The invention is illustrated in the accompanying drawings, in which—

Figure 1 is a plan view of the attachment applied to a sulky plow. Fig. 2 is a side elevation thereof.

The harrow frame consists of parallel transverse bars B conveniently made of gas pipe set to turn at their ends in side bars K. The teeth $b$ as fastened to the bars B and the slant thereof is controlled by a lever A which has a latch engageable with a notched segment C fastened to a bar $c$ which is pivotally connected to arms L projecting upwardly from the pipes B.

The harrow is connected to the plow by an arm D, conveniently made of pipe bent to form a double elbow the lower rear branch of which is rigidly attached to the extended front ends of the bars K, so that when the arm is swung up or down the harrow is raised from or lowered to the ground. The upper branch of the cranked arm D rests in bearings $d$ on the longitudinal beams M of the plow frame. This arm D serves two purposes: first, it draws the harrow; second, it raises the harrow clear of the ground whenever the plow itself is raised therefrom. The latter result is effected by a crank arm E fixed to the upper branch of the arm D and a link F connected to the main plow lever G, which latter operates in a known manner to raise or lower the plow. The link F is slotted as at $f$, and a pin $e$ projects from the arm E and works in the slot the pin and slot having a lost motion connection. When the lever G is drawn back to lift the plow, the arm E is pressed down and forward by the pin $e$ in contact with the end of the slot $f$. This turns the arm D in its bearings on the plow frame and swings up the rear end thereof, lifting the harrow from the ground. And when the lever G is thrown forward to drop the plow, the harrow is simultaneously lowered to the ground. The slot $f$ allows a certain amount of adjustment of the plow without varying the harrow action. Except as described, the plow construction is not material and needs no extended mention.

The invention is not limited to the particular form and construction shown but may be modified according to local conditions, and no limitation is implied with respect thereto. The simultaneous control and operation of the harrow and plow are advantageous and relieve the plowman of separate attention to and manipulation of the harrow. Various modifications of structure within the scope of the following claims will be obvious.

Means other than those described may be used to raise and lower the harrow. Any form of harrow may be used and any form of adjusting mechanism, such for example as a separate lever to raise the harrow, instead of the arm E and link F. Also a chain or rope may be connected from the plow to the harrow to assist the member D in drawing the harrow forward.

I claim—

The combination with a plow of a harrow attachment, comprising a rigid arm pivotally mounted at its front end on the plow frame to swing vertically, a harrow carriage at the rear of the frame, and a lever mounted on the frame and connected to the plow and to the arm whereby to raise and lower the harrow and the plow, the connection between the lever and the arm being a lost motion connection whereby to permit a limited adjustment of the plow without affecting the harrow.

JOHN F. BARBEE.

Witnesses:
 JENNIE LIMBO,
 W. W. HARPER.